Patented Apr. 14, 1953

2,635,096

UNITED STATES PATENT OFFICE 2,635,096

DICYCLOHEXYLSULFAMATE OF STREPTOMYCIN AND METHOD FOR PREPARATION THEREOF

Harley W. Rhodehamel, Jr., and William B. Fortune, Indianapolis, Ind., assignors to Eli Lilly and Company, Indianapolis, Ind., a corporation of Indiana No Drawing. Application August 18, 1948, Serial No. 44,994

10 Claims. (Cl. 260—210)

Our invention relates to a novel streptomycin salt and to its application in the purification of streptomycin and the production of therapeutic compositions.

The novel salt of our invention is the dicyclohexylsulfamic acid salt of streptomycin, which may be represented by the following formula

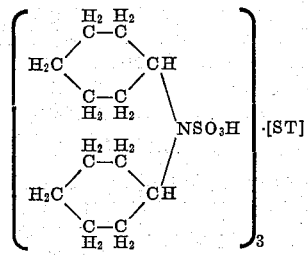

wherein [ST] represents streptomycin.

The above-represented salt is a crystalline compound as is evidenced by birefringence and extinction when viewed under a polarizing microscope, and by the crystallographic pattern obtained by X-ray studies. Analysis indicates that in anhydrous state, our novel salt comprises one molecule of streptomycin and 3 molecules of dicyclohexylsulfamic acid. Our salt is further characterized by a low solubility in water and an appreciable solubility in alcohols such as ethanol, propanol and butanol.

Our novel streptomycin salt is prepared by reacting streptomycin or a salt thereof with dicyclohexylsulfamic acid or one of its water-soluble salts, with one or both of the reactants dissolved or in finely divided state in a liquid dispersing agent which may be aqueous or organic. Water is preferred since streptomycin and its commonly employed acid addition salts are usually obtained in water solution, and moreover, water-soluble salts of dicyclohexylsulfamic acid are readily obtainable. The insoluble dicyclohexylsulfamic acid salt of streptomycin formed in the reaction is isolated by any of the usual methods, for example, by filtration.

As noted above, our novel salt is characterized by a low solubility in water and an appreciable solubility in alcohols. Thus, in water at 25° C. streptomycin dicyclohexylsulfamate dissolves to the extent of about 3.4 mg./ml., and in water at 4° C., to the extent of about 2 mg./ml., these values representing respectively on a weight-volume basis the amounts of about 0.14 percent and 0.08 percent of streptomycin base in solution. In ethanol at 25° C. streptomycin dicyclohexylsulfamate dissolves to the extent of about 160 mg./ml., in butanol at 25° C., to the extent of about 200 mg./ml., and in methanol at 25° C., to the extent of about 300 mg./ml. The solubility characteristics of streptomycin sulfamate are surprising in view of the ready solubility of streptomycin base, streptomycin sulfate and similar streptomycin salts in water, and their very slight solubility in alcohols.

As used herein, the term "streptomycin" is employed generically as inclusive of any of the antibiotic chemical entities possessing streptomycin-like activity which are produced by the growth of Actinomyces griseus mold in a suitable culture medium. Two of the chemical entities which have been identified are designated as streptomycin A and streptomycin B, for which compounds the terms streptomycin and mannosidostreptomycin, respectively, have been proposed [cf. Science, vol. 107, 233–234 (1948)]. Both of these recognized compounds as well as mixtures thereof form insoluble salts with dicyclohexylsulfamic acid. In their solubilities and other physical properties, the dicyclohexylsulfamic acid salts of streptomycin A and streptomycin B exhibit only moderate differences.

The dicyclohexylsulfamic acid salt of streptomycin has several fields of usefulness. The salt affords a convenient means of isolating streptomycin from solutions thereof, for example, aqueous solutions containing impure or purified streptomycin or its salts. Furthermore, the dicyclohexylsulfamate salt of streptomycin is suitable for therapeutic application, and when compounded in a form suitable for parenteral administration as set forth hereinafter, it provides a long-lasting, therapeutically effective blood concentration of streptomycin, in comparison with the salts of streptomycin in common therapeutic use.

The following procedure is illustrative of the employment of the dicyclohexylsulfamic acid salt of streptomycin in a streptomycin purification process: An aqueous solution of streptomycin is prepared by any of the known commercial processes of preparing streptomycin solutions having a concentration (determined by biological tests) of 20,000 to 100,000 or more mcg. (micrograms) of streptomycin per ml. of solution. The streptomycin is precipitated from the solution as streptomycin dicyclohexylsulfamate by means of dicyclohexylsulfamic acid or a water-soluble salt of dicyclohexylsulfamic acid. The precipitate so obtained is substantially white in color, the majority of the color originally present in the streptomycin remaining in the mother liquor.

From the streptomycin dicyclohexylsulfamate salt so obtained, streptomycin is recovered by suspending the streptomycin salt in water, acidifying the suspension to about pH 4 or less, for example with sulfuric acid, to liberate the dicyclohexylsulfamic acid, and extracting the aqueous mixture with a water-immiscible organic solvent such as butanol, amyl alcohol, amyl acetate or chloroform, to remove the dicyclohexylsulfamic acid from the aqueous phase in which the streptomycin remains dissolved as an acid addition salt. The aqueous solution containing the streptomycin then may be subjected to such additional treatment as desired, for example, evaporation to dryness to recover the streptomycin as its sulfate salt.

Therapeutic compositions embodying our novel streptomycin salt are of especial importance since parenteral administration of streptomycin dicyclohexylsulfamate in suitable form produces a prolonged therapeutic action. Injectable compositions are obtained by suspending our novel salt in finely divided form, e. g. 200 mesh, in a suitable aqueous or oleaginous vehicle. Streptomycin A dicyclohexylsulfamate has a potency of about 420 mcg./mg. as compared with the 1000 mcg./mg. possessed by streptomycin A base. Streptomycin A is preferred for therapeutic use because of its greater therapeutic effectiveness as compared with Streptomycin B.

An aqueous composition suitable for parenteral therapeutic administration is as follows:

Streptomycin dicyclohexylsulfamate_____g__ 2
Water, q. s_____ml__ 4

An oleaginous composition which upon parenteral administration will maintain a therapeutically effective blood concentration of streptomycin for as long as 24 hours, is as follows:

Streptomycin A dicyclohexylsulfamate____g__ 2
Sesame oil, q. s_____ml__ 4

Compositions containing greater or lesser amounts of streptomycin than are contained in the above illustrative compositions may be employed. Thus, for example, compositions containing from about 0.1 g. to about 0.6 g. of finely divided streptomycin dicyclohexylsulfamate per ml. of suspension, are quite suitable for therapeutic use.

Numerous oleaginous vehicles are suitable for the preparation of therapeutically useful suspensions of our novel salt, there being included vegetable oils such as sesame, peanut, cottonseed oil and the like, and partially hydrogenated vegetable oils, and also synthetic esters of fatty acids, for example ethyl oleate.

Other additaments may be incorporated in the therapeutic compositions, for example, suspending agents such as sodium lauryl sulfate, aluminum stearate and monostearin, these agents aiding in the maintenance of suspension of the streptomycin salt in the vehicle. Additionally, other agents may be incorporated in the suspension of the streptomycin sulfamate salt in the vehicles. Thus for example a local anesthetic may be employed in small amounts to lessen the pain at the site of the injection. Other modifications of the therapeutic compositions as set forth above will be apparent to those skilled in the art.

The following examples illustrate more specifically, preferred methods of preparation of our novel streptomycin salt, and its employment in the purification of streptomycin.

*Example 1*

To a solution of about 5.5 g. of sodium dicyclohexylsulfamate dissolved in about 100 ml. of warm water is added with stirring a solution of about 4.45 g. of the sulfate of streptomycin A in about 25 ml. of water. Upon mixing the solutions, a precipitate comprising the dicyclohexylsulfamate salt of streptomycin A forms. The mixture is cooled to about 0° C. and the precipitate is separated from the cold mixture by filtration. The separated precipitate of streptomycin dicyclohexylsulfamate is washed with a small amount of cold water and dried.

The dicyclohexylsulfamate salt so prepared exhibits birefringence and extinction when viewed in a polarizing microscope, and X-ray studies give a pattern indicative of crystalline structure. The molecular weight of the anhydrous salt is 1362. Its solubility in water at about 4° C. is about 0.2 percent on a weight-volume basis. Its potency is about 420 mcg./mg.

*Example 2*

200 ml. of an aqueous solution containing about 50,000 mcg./ml. of streptomycin base comprising chiefly streptomycin A, but containing some streptomycin B, are treated with 22 g. of potassium dicyclohexylsulfamate dissolved in 450 ml. of water. The precipitate of streptomycin dicyclohexylsulfamate which forms is filtered off and dried in vacuo. About 22.5 g. of crystalline streptomycin dicyclohexylsulfamate assaying about 400 mcg./mg. are obtained.

*Example 3*

The procedure of Example 1 is followed except that instead of a solution of sodium dicyclohexylsulfamate, a suspension of 5.0 g. of dicyclohexylsulfamic acid in 50 ml. of water is employed. The precipitate of crystalline streptomycin dicyclohexylsulfamate which forms is separated by filtration and dried in vacuo.

*Example 4*

100 ml. of an aqueous solution containing about 40,000 mcg./ml. of streptomycin sulfate is shaken with 100 ml. of a chloroform solution containing about 8 g. of dicyclohexylsulfamic acid. A precipitate of crystalline streptomycin dicyclohexylsulfamate is formed. The streptomycin dicyclohexylsulfamate is separated by filtration and is dried in vacuo.

*Example 5*

Streptomycin broth obtained by growing *Actinomyces griseus* in a culture medium, is acidified to about pH 2 with dilute acid and clarified with decolorizing carbon. The filtered broth is adjusted to about pH 7 and the streptomycin is adsorbed on activated carbon. The carbon containing the adsorbed streptomycin is washed with water and the streptomycin is statically eluted from the carbon with an aqueous acetone solution, the eluate being acidified from time to time with sulfuric acid until an acidity of about pH 2 is maintained. To the eluate are added 3 volumes of acetone whereupon streptomycin sulfate precipitates. The precipitate is separated by filtration and dissolved in sufficient water to produce an aqueous solution of streptomycin sulfate having a streptomycin concentration of about 100,000 mcg./ml. The acidity of the solution is adjusted to about pH 5. To 10 liters of streptomycin sulfate solution obtained as above is added with stirring a solution of 1800 g. of sodium dicyclohexylsulfamate dissolved in about 35 liters of warm water. The precipitate of streptomycin dicyclohexylsulfamate which separates is filtered off. The mother liquor is concentrated to about ½ its volume by evaporation in vacuo and is cooled to below about 10° C. The further quantity of streptomycin dicyclohexylsulfamate which separates is filtered off and combined with the original precipitate. The combined precipitate is suspended in about 30 liters of water and sufficient sulfuric acid to bring the aqueous mixture to about pH 1. The acidified mixture is extracted with about three 20-liter portions of butanol to remove the sulfamic acid liberated upon the acidification of the solution. The extracted aqueous phase comprising a solution of streptomycin sulfate is adjusted to about pH 5.5 with an ion exchange resin and is evaporated to dryness. The residue comprises streptomycin sulfate having a potency of about 700 mcg./mg. as compared with the potency of about 820 mcg./mg. possessed by pure streptomycin sulfate.

*Example 6*

The procedure of Example 2 is repeated except that hydrochloric acid is used throughout the procedure in place of sulfuric acid so that streptomycin hydrochloride is obtained as the product.

*Example 7*

Streptomycin B dicyclohexylsulfamate is prepared from sodium dicyclohexylsulfamate and streptomycin B sulfate according to the procedure of Example 1. The streptomycin B dicyclohexylsulfamate which precipitates is filtered off, is washed with a small amount of water and dried. Purified streptomycin B dicyclohexylsulfamate has a potency of about 120 mcg./mg.

We claim:

1. A dicyclohexylsulfamate salt represented by the formula

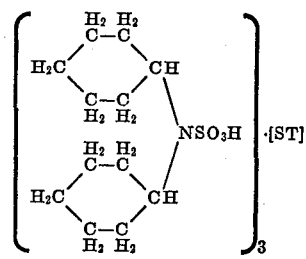

wherein [ST] represents a member of the group consisting of streptomycin and mannosidostreptomycin.

2. Streptomycin dicyclohexylsulfamate.

3. Mannosidostreptomycin dicyclohexylsulfamate.

4. A process which comprises reacting a member of the group consisting of streptomycin and mannosidostreptomycin with a member of the group consisting of dicyclohexylsulfamic acid and water-soluble salts thereof and separating the insoluble salt which precipitates.

5. The method according to claim 4 in which streptomycin is present in the solution as a water-soluble salt.

6. The method of claim 4 in which streptomycin is present in solution as the free base.

7. The method of isolating a compound of the group consisting of streptomycin and mannosidostreptomycin from an aqueous solution thereof which contains more than about .8 mg. of streptomycin activity per milliliter of solution, said method comprising forming the dicyclohexylsulfamate salt of said compound, separating said salt and recovering the said compound from said salt.

8. The method of obtaining an aqueous solution of a purified streptomycin from an impure aqueous solution thereof which contains more than about 0.08 percent streptomycin, said method comprising reacting the streptomycin in solution with a member of the group consisting of dicyclohexylsulfamic acid and its water-soluble salts, separating the insoluble streptomycin sulfamate which precipitates, suspending said precipitate in water, acidifying the aqueous mixture and extracting said mixture with a water-immiscible organic solvent whereby dicyclohexylsulfamic acid is removed and the streptomycin is left in purified form in aqueous solution.

9. The method according to claim 4 in which mannosidostreptomycin is present in the solution as a water-soluble salt.

10. The method of claim 4 in which mannisidostreptomycin is present in solution as a free base.

HARLEY W. RHODEHAMEL, Jr.
WILLIAM B. FORTUNE.

References Cited in the file of this patent

UNITED STATES PATENTS

| Number | Name | Date |
| --- | --- | --- |
| 2,275,125 | Audrieth et al. | Mar. 3, 1942 |
| 2,462,175 | Folkers | Feb. 22, 1949 |
| 2,493,489 | Langlykke et al. | Jan. 3, 1950 |
| 2,501,014 | Wintersteiner et al. | Mar. 21, 1950 |

OTHER REFERENCES

Audrieth et al., J. Org. Chem., v. 9 (1944), page 96.

Herrell, "Penicillin and Other Antibiotic Agents" (1946), page 318.

Le Page et al., J. Biol. Chem. 162 (1946), pages 167 and 170.

Waksman, Science, v. 107 (March 1948), pages 233–234.